Patented Jan. 2, 1934

1,941,708

UNITED STATES PATENT OFFICE

1,941,708

COATING COMPOSITION AND FILM PRODUCED THEREBY

William Henry Moss and Blanche B. White, Cumberland, Md., assignors to Celanese Corporation of America, New York, N. Y., a corporation of Delaware No Drawing. Application March 3, 1928
Serial No. 258,998

4 Claims. (Cl. 134—79)

This invention relates to coating compositions containing derivatives of cellulose and particularly to a new and improved synthetic resin for use in the same prepared from phenol and furfural.

An object of our invention is to provide a coating composition containing derivatives of cellulose and particularly organic substitution derivatives of cellulose that produces clear, homogeneous, hard, tough films.

A further object of our invention is to provide a suitable resin for lacquers containing organic substitution products of cellulose such as cellulose acetate, which resin is compatible with the other constituents of the lacquers and which produces clear solutions which, upon drying, form films that are adherent, tough, hard and water repellent.

The preparation of a lacquer containing organic derivatives of cellulose such as cellulose acetate as the main constituent of the lacquer base, which lacquer is to be applied to a hard, smooth surface, presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the films produced from it, both the lacquer and the films produced become cloudy and unhomogeneous.

We have found that the synthetic resins produced from phenol and furfural are compatible with cellulose acetate and that when added to lacquers containing cellulose acetate, they form clear solutions that, upon drying, produce clear, hard, tough and firmly adherent films varying in color from almost colorless to dark brown, depending upon the conditions of the preparation of the resin and the proportions used.

The selection of a suitable resin for a lacquer containing the organic derivatives of cellulose presents a difficult problem because the resin must be compatible with the organic derivatives such as cellulose acetate, both in solution and in the dry films and also with softeners, pigments, dyes which may be added to produce desired effects and variations of the films. In general, a synthetic resin for this purpose should be easily prepared from preferably cheap materials, it should be easily freed from any catalysts, either acid or alkaline, used in its preparation, it should of itself be practically neutral and should be strongly resistant to water and free from soluble materials. It should be hard and solid at ordinary temperatures and its solutions from volatile solvents should dry quickly and completely when applied as a film without a long continued retention of low boiling point solvents such as sometimes occurs with phenol formaldehyde resins.

We have found that the resins prepared from phenol and furfural in the presence of either acid or alkaline catalysts can be used as above stated in cellulose derivative lacquers.

In accordance with our invention, we prepare a synthetic resin formed by the condensation of furfural with an alcohol of the phenol type. This synthetic resin is then used for making a lacquer which contains one or more derivatives of cellulose and a volatile solvent. The lacquer may also contain one or more natural or semi-synthetic resins or gums, one or more plastifiers or softening agents, medium and/or high boiling solvents and preferably but not necessarily some pigments and/or dyes.

The synthetic resin of the phenol furfural type may be prepared in the presence of either acid or alkaline catalysts but we prefer to use the resins prepared in the presence of alkaline catalysts in the cellulose derivative lacquers. The term "phenol" includes not only the simple phenol (hydroxy benzene, $C_6H_5OH$) but all its homologues, the polyphenols such as resorcin and the like, the naphthols and their derivatives with a free hydroxyl group. Compounds having free hydroxyl groups such as methylene diphenol $CH_2(C_6H_4OH)_2$ diphenylol propane $(CH_3)_2C(C_6H_4OH)_2$ and similar compounds, in which the phenol group is replaced by the naphthol group, may also be used for preparing the resin.

The cellulose derivative may be an inorganic ester such as cellulose nitrate but we prefer to use organic derivatives of cellulose such as organic esters of cellulose and organic ethers of cellulose. Examples of organic esters of cellulose are cellulose acetate, cellulose formate, cellulose propionate and cellulose butyrate. Examples of organic ethers of cellulose are ethyl cellulose, methyl cellulose and benzyl cellulose.

The natural gums or resins or semisynthetic resins that may be used in the lacquer are many. Of the natural gums that may be used the following may be mentioned: manila, accaroides, pontianak, kauri, dammar, rosin and shellac. An example of a semi-synthetic resin is ester gum, which is the glycerol ester of rosin.

Of the plastifiers or softeners that may be used, the following are given by way of examples: diethyl phthalate, tricresyl phosphate, triphenyl phosphate, amides, such as mono methyl toluene sulfonamide, triacetin, diphenylol propane, thiocarbonlide, etc. Examples of medium and/or high boiling solvents are ethyl acetate, ethyl lactate, tetrachlorethane, benzyl alcohol or diacetone alcohol. Obviously other medium or high boiling solvents may be used.

The low boiling solvents may be any one or a mixture of two or more of any of the following liquids: acetone, alcohol, benzene or ethylene dichloride. The pigments or dyes used may be any of the ordinary pigments or dyes used in the paint or lacquer industry.

To further explain our invention the following description of one mode of preparing a resin of the phenol aldehyde type in the presence of an alkaline catalyst is given by way of illustration. However, it is to be understood that the method of preparation, the choice of catalyst, the nature of the reactants and the proportions of reactants can be varied within wide limits.

To prepare a phenol furfural resin

| | Parts |
|---|---|
| Phenol | 100 |
| Furfural | 75 |
| Sodium carbonate or trisodium phosphate | 10 | are heated under reflux for several hours. A brown resin is obtained which is separated from the watery liquid also produced. It is washed with hot water, with dilute acid solution, and again with hot water, these operations being performed without overheating the resin; e. g., by heating in an oil bath at a regulated temperature, about 100 to 120° C., since the resin is of the reactive type and will, on prolonged heating, change to an insoluble and infusible product. The resin is freed from water by drying—in the air, distillation, under vacuum or otherwise.

The resin thus obtained is soluble in acetone, alcohol, etc., and largely insoluble in benzene. In general, it is a brown, hard resin having a melting point from 60 to 100° C. The solution in acetone is entirely miscible with solutions of cellulose acetate in the usual solvents, and the lacquers produced by addition of this resin to a cellulose acetate lacquer give, on application to metal, wood, etc., clear, light brown or yellow films.

The resin may be dissolved alone in any suitable solvent or mixture of solvents, and the solution thus produced may be added to a solution of cellulose derivative in the same or other solvents; and plasticizers, dyes, pigments, stabilizers, may be added to either or both solutions or to the mixed solution, or else the resin and the cellulose derivative may be dissolved together in the desired solvents or mixture of solvents or mixture of substances which are themselves non-solvents for the cellulose acetate and resin, but which become solvents when mixed together, and dyes, pigments, plasticizers, may be added as desired, at any stage in the above proceedings.

Further, we have found that the above resin is especially desirable for admixture with other synthetic resins and natural resins, the said mixtures of resins being also compatible with cellulose acetate in solutions, lacquers, plastic masses and films. Thus the phenol-furfural resin may be mixed with a phenol formaldehyde type resin and preferably with a phenol-formaldehyde resin prepared in the presence of an acid catalyst, in any proportion; the mixture being, as stated, compatible with cellulose acetate in solutions, lacquers, plastic masses and films. These mixtures are especially useful where a light fast resin is desired for, whereas the phenol formaldehyde type of resin generally darkens on exposure to sunlight or ultraviolet light, the films of phenol-furfural resins, after a slight initial darkening, gradually become lighter in color. Thus mixtures of the two types of resins, the exact proportions of which will vary with different specimens of resins, according to the method of preparations of the said resins, can be made, which mixtures are substantially light fast, the phenol-formaldehyde portions of which were not light fast.

Thus also the phenol-furfural resin may be mixed with natural resins such as kauri, pontianak, manila, dammar, rosin and semi artificial resins such as ester gum, all of which mixtures are compatible with cellulose acetate in solutions, lacquers, films, plastic masses, although the said natural resins and ester gum are not of themselves compatible with cellulose acetate.

These admixtures of natural and synthetic resins with the phenol-furfural resin may be made in any way. They may be mixed, fused or ground together, dissolved together in suitable solvents or dissolved separately and their solutions mixed together or the said solutions mixed with cellulose acetate solutions to form lacquers, and dyes, pigments, softeners, etc., may be added as desired.

The following examples of lacquers or coating compositions are given as illustrations of lacquers, but it is to be understood that the proportions and the constituents may be widely varied, as is well known to one skilled in the art.

*Example I*

| | Parts |
|---|---|
| Cellulose acetate | 10 |
| Phenol furfural synthetic resin | 10 | are dissolved in 100 parts of a solvent. This solvent may be acetone alone or it may be a mixture of:

| | Parts |
|---|---|
| Acetone | 50 |
| Benzene | 25 |
| Alcohol (ethyl or denatured) | 25 |

If desired, 20 parts of ethyl lactate may be added to either of the above lacquers. Instead of using 10 parts of phenol furfural resin, 30 parts of the same may be added in the above described lacquers.

*Example II*

A lacquer may be made of the following composition:

| | Parts |
|---|---|
| Cellulose acetate | 20 |
| Phenol furfural synthetic resin | 5 |
| Acetone | 50 |
| Ethyl acetate | 20 |
| Benzene | 30 |
| Benzyl alcohol | 5 |

*Example III*

A lacquer may be made up as follows:

| | Parts |
|---|---|
| Cellulose acetate | 7 |
| Phenol furfural synthetic resin | 7 |
| Diethyl phthalate | 4 |
| Tricresyl phosphate | 2 |
| Acetone | 50 |
| Alcohol | 25 |
| Benzene | 25 |
| Toluene | 10 |
| Ethyl lactate | 15 |

To this lacquer may be added 5 to 10 parts of pigments or one or two parts of dye.

Example IV

A lacquer that produces light fast films is made as follows:

|  | Parts |
|---|---|
| Cellulose acetate | 10 |
| Phenol furfural resin | 5 |
| Phenol formaldehyde resin | 5 |
| Acetone | 100 |

Instead of using acetone alone as a solvent, the following solvents may be used:

|  | Parts |
|---|---|
| Acetone | 50 |
| Benzene | 25 |
| Alcohol | 25 |
| Ethyl lactate | 20 |

Example V

The following is an illustration of a lacquer containing the phenol furfural resin and a natural resin.

|  | Parts |
|---|---|
| Cellulose acetate | 10 |
| Phenol furfural resin | 10 |
| Natural resin e. g. manila | 5 |
| Acetone | 40 |
| Ethyl acetate | 30 |
| Benzene | 10 |
| Diacetone alcohol | 10 |

To this may be added, if desired, 5 parts of diethyl phthalate as a softener. If a colored lacquer is desired, 5 to 10 parts of pigments and/or 1 to 5 parts of dye may be used.

Example VI

Another illustration of a lacquer that produces light-fast films is the following:

|  | Parts |
|---|---|
| Cellulose acetate | 15 |
| Phenol furfural resin | 10 |
| Phenol formaldehyde resin | 5 |
| Ester gum | 5 |
| Diethyl phthlate | 10 |
| Triacetin | 5 |
| Pigment | 15 |
| Dye | 5 |
| Acetone | 150 |
| Benzene | 50 |
| Alcohol | 50 |
| Ethyl lactate | 20 |
| Diacetone alcohol | 20 |

Example VII

|  | Parts |
|---|---|
| Cellulose acetate | 10 |
| Phenol furfural resin | 5 |
| Furfural aniline resin | 5 |
| Acetone | 100 |
| Diacetone alcohol | 20 |

In the above examples, the cellulose acetate may be of any of the various types, high or low viscosity, acetone, or chloroform soluble, and may be replaced in part, or wholly, by other cellulosic derivatives such as the propionate, butyrate, etc.

It is to be understood that the foregoing details are given merely by way of illustration and that many variations may be made therein without departing from the spirit of this invention. Having described our invention what we claim and desire to secure by Letters Patent is:

1. A coating composition comprising an organic derivative of cellulose, a phenol-furfural resin which bleaches on exposure to light, a phenol-aldehyde resin which darkens on exposure to light and a common solvent, the proportions of resins present being such as to produce films that maintain their color unchanged on exposure to light.

2. A coating composition comprising cellulose acetate, a phenol-furfural resin which bleaches on exposure to light, a phenol-aldehyde resin which darkens on exposure to light and a common solvent, the proportions of resins present being such as to produce films that maintain their color unchanged on exposure to light.

3. A coating composition comprising an organic derivative of cellulose, a phenol-furfural resin prepared in the presence of an alkaline catalyst which bleaches on exposure to light, a phenol-aldehyde resin which darkens on exposure to light and a common solvent, the proportions of resin present being such as to produce films that maintain their color unchanged on exposure to light.

4. A coating composition comprising cellulose acetate, a phenol-furfural resin prepared in the presence of an alkaline catalyst which bleaches on exposure to light, a phenol-aldehyde resin which darkens on exposure to light and a common solvent, the proportions of resin present being such as to produce films that maintain their color unchanged on exposure to light.

WILLIAM HENRY MOSS.
BLANCHE B. WHITE.